United States Patent [19]

Abaimov et al.

[11] 3,817,511

[45] June 18, 1974

[54] DEVICE FOR RIGGING THE POSITION OF AND GRIPPING A WORKPIECE RELATIVE TO THE MACHINE

[76] Inventors: Valery Grigorievich Abaimov, Zvezdny bulvar, 20, kv. 7, Moscow; Alexei Savelievich Kochinev, Novomytischinsky prospekt, 23/7, kv. 87, Novye Mytischi Moskovskoi oblasti; Sergei Nikolaevich Kiselev, ulitsa Kosmonavtov, 16, kv. 34, Moscow; Vladimir Mifodievich Nikiforov, ulitsa Kosmonavtov, 16, kv. 34, Moscow; Georgy Mesropovich Parsegov, Leninsky prospekt, 82/2, kv. 187, Moscow, all of U.S.S.R.

[22] Filed: Mar. 22, 1972

[21] Appl. No.: 237,191

[52] U.S. Cl............ 269/227, 269/27, 269/32, 269/244, 279/112
[51] Int. Cl............................................. B25b 1/10
[58] Field of Search .......... 269/244, 245, 240, 225, 269/227, 27, 30, 32; 279/110, 112, 113

[56] References Cited
UNITED STATES PATENTS

| | | | |
|---|---|---|---|
| 57,383 | 8/1866 | Ross | 279/113 |
| 767,678 | 8/1904 | Barnaby | 279/113 |
| 874,406 | 12/1907 | Johnson | 269/245 X |
| 1,048,944 | 12/1912 | Cook | 279/113 |
| 1,117,480 | 11/1914 | Church | 279/110 |
| 1,209,356 | 12/1916 | Syvret | 269/245 X |
| 2,183,369 | 12/1939 | Schurr | 279/113 |
| 2,883,201 | 4/1959 | Goodrum | 279/113 |
| 3,010,728 | 11/1961 | Jennings | 279/110 X |
| R12,068 | 12/1902 | Potter et al. | 279/112 |

*Primary Examiner*—Al Lawrence Smith
*Assistant Examiner*—J. T. Zatarga
*Attorney, Agent, or Firm*—Holman & Stern

[57] ABSTRACT

A clutch device ensuring the connection of a screw with the shaft of a gear wheel of a rack-and-gear transmission which is made reversible and has asymmetrically chamfered teeth providing for rotation of its semiclutches which transmit rotation directly to the motion screw in mutually opposite directions, as well as a sliding-through of the semiclutches during the turns of the gear wheel that are reversible relative to the direction of rotation of the semiclutches. The mechanism used for reversing the clutch is provided with a resilient arrangement ensuring pressing of the semiclutches brought into interaction with the aid of the mechanism used for reversing the clutch.

2 Claims, 4 Drawing Figures

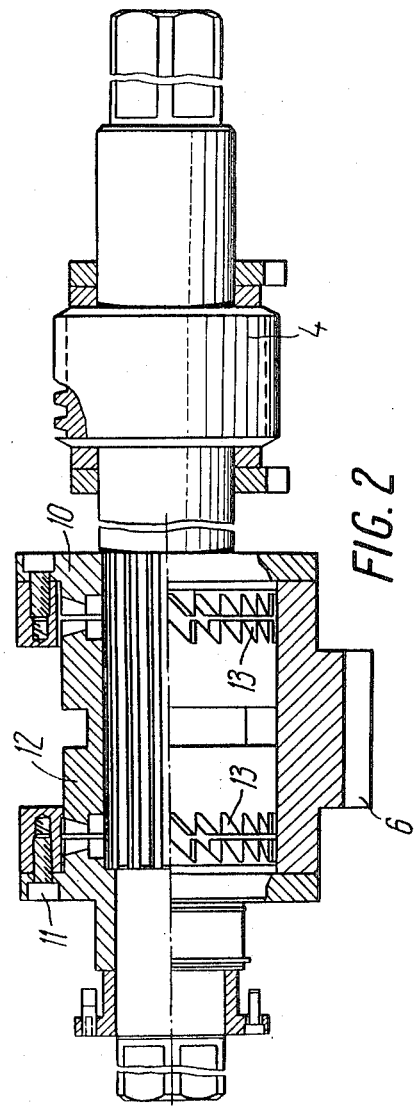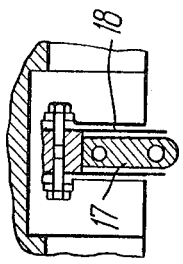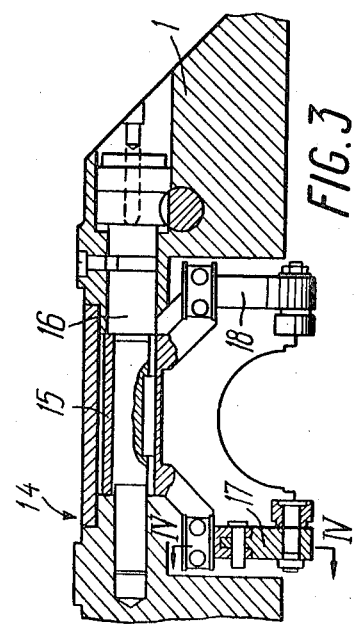

DEVICE FOR RIGGING THE POSITION OF AND GRIPPING A WORKPIECE RELATIVE TO THE MACHINE

BACKGROUND OF THE INVENTION

The present invention relates to machine-building equipment and, more particularly, to a devices for rigging the position of and gripping a workpiece relative to the machine for working.

The device according to the present invention is used mainly for rigging the position of and gripping large-sized workpieces machined in vertical lathes.

At present, devices comprising a gripping jaw mounted so that it can be displaced in the longitudinal guides of a housing of said device by means of a motion screw operatively connected to the jaw are known in the art and are used for rigging the position of and for gripping large-sized workpieces for vertical lathes.

The screw proper is operatively connected through an intermediary cam clutch with a gear wheel of a rack-and-gear transmission; the rack being reciprocated by means of a hydraulic cylinder fed by a hand hydraulic pump (cf. USSR Inventor's Certificate No. 132,029; Cl. 49a, 27$_{04}$, 49c, 31$_{02}$).

The main disadvantage of such devices lies in the limited stroke of the gripping jaw, as its stroke depends on the length of the rack of the rack-and-gear transmission.

In order to enlarge the stroke of the gripping jaw, the length of the rack must be increased which results in a considerable increase in the overall dimensions of the device both due to an enlargement in the length of the rack and to an increase in the size of the power cylinder because of the enlargement of the length of the rack sizes. However, this constructive embodiment does not eliminate the limited stroke of the gripping jaw.

Also devices for rigging the position of workpieces, which are essentially a hydraulic cylinder in which a gripping jaw secured to a rod or a movable casing of a hydraulic cylinder which serves as the working member for imparting reciprocation to the workpiece are widely known in the art. Working fluid is supplied by a hand displacement pump to the hydraulic cylinder.

The main disadvantage of these devices lies in the fact that, due to an inevitable leakage of the working liquid through the packing therefore, there is no provision for self-braking, which necessitates additional mechanisms for gripping and holding the workpiece while it is being machined.

Also devices for rigging the position of and for gripping a workpiece are well known in the art, and in which the motion screw for displacing the gripping jaw is rotated by a system of gear wheels that are driven by hand.

The main disadvantage of this type of device is that they necessitate the use of hard manual labor. This disadvantage is also inherent in the afore-described devices.

Low efficiency resulting from a prolonged process for rigging the position of the workpieces even when carried out with the aid of the aforesaid devices also constitutes a disadvantage that is common to all said devices.

SUMMARY OF THE INVENTION

It is therefore an object of the present invention to eliminate the aforementioned disadvantages of said devices.

The present intention of this invention is to improve the operative connection of the motion screw with the rack-and-gear transmission.

This object is accomplished by a device for rigging the position of and for gripping a workpiece relative to a machine which comprises a gripping jaw driven by a motion screw operatively connected to a gear wheel of a rack-and-gear transmission drive by means of a cam clutch operation, and according to the present invention, the clutch is made reversible and has asymmetrically chamfered geared teeth providing for the rotation of its embodied semiclutches which transfer motion directly to the motion screw in mutually opposite directions, as well as a sliding-through motion of the same semiclutches during the turns of the gear wheel, said clutches also being reversible relative to the direction of rotation of the semiclutches. Also provided is a mechanism for reversing the clutch which is further provided with a resilient arrangement to somewhat press the semiclutches brought into interaction by said mechanism used for reversing the clutch, said mechanism for reversing the clutch also being provided with a resilient member for pressing the interacting semiclutches.

This operative connection for the motion screw with the gear wheel of the rack-and-gear transmission provides for an automatic disengagement of the motion screw from the gear wheel during every reverse stroke of the rack, this ensuring an intermittent but unlimited left-hand or right-hand rotation of the screw and, consequently, an unlimited intermittent displacement of the gripping jaw either in the forward or backward direction.

More particularly, the semiclutches are pressed by a switch-over link of the mechanism used for reversing the clutch which is hinged and pressed from two opposite sides by springs which, when taken in combination, serve as the resilient arrangement. This embodiment of the switch-over link provides for pressing both the semi-clutch transferring left-hand rotation to the screw and the semiclutch transferring the right-hand rotation to the same screw during the respective switching-on of the mechanism used for reversing the clutch.

BRIEF DESCRIPTION OF THE DRAWING

The following detailed description of the exemplary embodiment of the present invention is given with reference to the accompanying drawings, in which:

FIG. 2 shows a longitudinal section of the clutch unit of the same device;

FIG. 3 is the mechanism used for reversing the clutch, employed in the same device (shown in a cross-section relative to the device); and FIG. 4 is a section taken along line IV–IV of FIG. 3.

DETAILED DESCRIPTION OF THE PREFERRED EMBODIMENT

Figure 1:
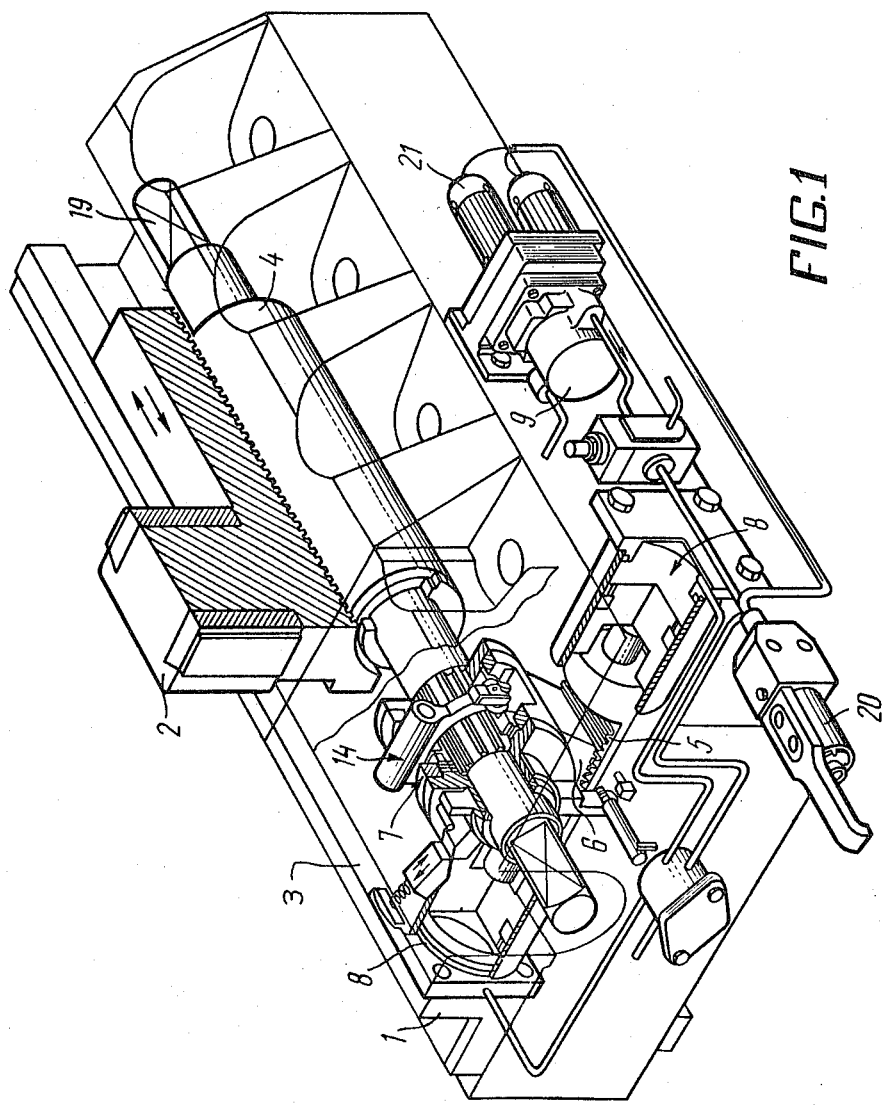
FIG. 1 shows a general space view of the device for rigging the position of and gripping a workpiece, according to the present invention.

The device for rigging the position of and gripping a workpiece, designed in accordance with the present invention, comprises a housing 1 (FIGS. 1 and 3) accommodating a gripping jaw 2 (FIG. 1) mounted in longitudinal guides 3 of the housing 1; a motion screw 4 (FIGS. 1 and 2) operatively connected with the jaw 2; a rack-and-gear transmission comprising a toothed rack 5 (FIG. 1) and a gear wheel 6 (FIGS. 1 and 2). The screw 4 is connected with gear wheel 6 through the a reversible cam clutch 7 (FIGS. 1 and 2).

The rack 5 is accompanied by a reciprocating hydraulic cylinder 8 (FIG. 1) operated by a pump 9 mounted outside the housing 1. The rack 5 proper is essentialy the rod for the hydraulic cylinder 8.

The clutch 7 consists of three semiclutches 10, 11 and 12 (FIG. 2) having asymmetrically chamfered teeth 13.

The direction of one chamfer of each tooth is close to the radial direction, while that of the other one is, to a certain extent, gently sloping.

The angle of inclination of the sloping chamfer relative to the axis of the tooth is chosen so as to depend upon the resistance arising in the course of displacement of the semiclutch 12 along the splined joint and so that it does not exceed 45°.

The semiclutches 10 and 11 are rigidly connected to the gear wheel 6 and are mounted on the screw 4 and are fixed thereon to preclude their longitudinal displacement, the chamfers of the teeth of the semiclutch 11 being inclined relative to the chambers of the teeth of the semiclutch 12 in the opposite directions.

The third semiclutch 12 is mounted on the screw 4 between the semiclutches 10 and 11 on slits in such a manner that it can be displaced relative to the latter, and with similar asymmetrically chamfered teeth; the chamfers of the teeth disposed at one side of the semiclutch being inclined in the opposite direction relative to the chamfers of the teeth on the other side of the same semicluth. This provides reversing when the semiclutch 12 is engaged with the semiclutch 10 or with the semiclutch 11. The clutch 7 may be reversed with the aid of a mechanism 14 (FIGS. 1 and 3) used for that purpose.

This mechanism is essentially a fork lever 15 (FIG. 3) rigidly mounted on a shaft 16 mounted in the housing 1. Switch-over links 17 FIGS. 3, 4) are hinged to the end portions of lever 15 each of which is pressed from the two opposite sides by leaf springs 18 (FIG. 4).

The springs are disposed in the plane with respect to the switch-over links 17 for working the displacements of the lever which take place during clutch reversing.

In order to perform the operations of rigging the position of and gripping a workpiece, at least two such devices are used, although sometimes four may be used but, rarely three and more are rarely used for one device. In the latter case it is necessary to use an auxiliary support arrangement.

The devices taken in the required number are secured to the chuck of the machine by means of a spline bolts (the drawing does not show the fixation of the devices to the chuck) In case the devices are taken in an even number, they may be disposed on the chuck by pairs which are opposite of one another. The number of the devices chosen is depending upon the cutting force of the machine, the weight and dimensions of the workpiece.

Thus, a workpiece to be machined is placed on the same chuck between the devices by means of a crane.

Thereater, the gripping jaws 2 are moved by way of rotating the motion screws 4 by hand until they contact the workpiece.

The screws are manually rotated by means of a box wrench fitted onto the tail 19 (FIG. 1) of the screw 4.

Thus, the value of displacement of the axis of the workpiece relative to the axis of the chuck of the machine is determined by rotating the chuck relative to a stationary indicator.

By having determined the direction and value of the necessary displacement of the workpiece relative to the axis of the chuck, the gripping jaws 2 of the devices disposed at the opposite side of the direction of the displacement are moved aside to the value of the necessary displacement, and the gripping jaws of the other devices start to extend.

In order to provide for the extension for moving the jaws 2, aside the fork lever 15 is turned in the required direction with a corresponding turn of the shaft 16 of the mechanism 14. The switch-over links 17 are turned together with the lever and act upon the semiclutch 12 which engages either the semiclutch 10 or the semiclutch 11, depending on whether the jaws are to be moved forward or backward. Then, an electric current is supplied to an electric motor 21 of the pump 9 through plug 20 disposed on a flexible cable.

The working fluid supplied by the pump 9 actuates the hydraulic cylinder 8, and the rack 5 starts reciprocating, and the direction of the working liquid flow in the cylinder 8 is automatically changed at the end of every stroke of the rack 5. While reciprocating, the rack 5 imparts a pendulum motion to the gear wheel 6 engaged therewith.

Due to the fact that the chamfered teeth of the semiclutches 10, 11 and 12 are asymmetrical, the semiclutches 10 and 11 may transmit rotation from the wheel 6 to the screw 4 in one or the other direction, each of the semiclutches 10 and 11 transmitting rotation in one direction only. This is explained by the fact that the chamfered teeth of the working surface of the gears are such that some of the chamfered gears engage the teeth of the semiclutches 10 and 12, or 11 and 12, respectively, while the opposite teeth of the same gears provide for an automatic disengagement of the semiclutch 12 from the respective semiclutch 10 or 11, that has been engaged with the semi-clutch 12 with the aid of the mechanism 14. Due to the actuation of the semi-clutches using mechanism 14, every reverse stroke of the rack 5 is accompanied by an idle rotation of wheel 6.

Due to employment of the springs 18, after it has been disengaged from the semiclutch 10 or 11, the semiclutch 12 is pressed thereto again.

The semiclutches continue sliding through until the rack 5 starts moving in the opposite direction. In this case the teeth of the respective semiclutch 10 or 11 engage the semiclutch 12, and rotation is transmitted to the screw. As a result of this periodic actuation of the clutch 7, the screw 4 performs an intermittent rotation thereby providing for an unlimited displacement of the jaw 2.

The jaws 2 are extended until the workpiece is pressed against the jaws 2 of the same devices disposed at the opposite side to the direction of that required for this engagement of the workpiece.

In order to ensure a precise alignment of the axes of the workpiece and the chuck, it is sometimes necessary to repeat the aforedescribed operations many times, whose number depends mainly on the intricacy of the workpiece and its shape.

After the axes of the workpiece and the chuck are precisely aligned, the workpiece is gripped by being pressed by the jaws 2 of all the devices.

The plug is then disconnected in order to discontinue the operation of the pump whereupon the workpiece is machined in the machine.

In order to release the workpiece after the completion of the machining, the clutch is reversed by means of the mechanism 14 through an appropriate turn of the shaft 6. Thereafter, the jaws 2 are moved backward in a manner analogous to the foward movements described above.

We claim:

1. A device for rigging the position of and the gripping of a workpiece on a machine, comprising a housing; longitudinal guides disposed in said housing; a gripping jaw mounted in said longitudinal guides in such a manner that it can displace longitudinally therein; a motion screw also disposed in said housing and kinematically interacting with said gripping jaw; a toothed rack and a gear wheel disposed in said housing making a rack-and-gear transmission engaging with each other; a reversible cam clutch having asymmetrically chamfered teeth by means of which said screw is connected with said gear wheel; semiclutches in said clutch, one of them directly transmitting motion to said motion screw; the asymmetrical chamfering of said teeth on either side of said one of said semiclutches directly transmitting motion to said screw makes for rotation thereof in mutually opposite directions, as well as for the slipping of said semiclutches when said gear wheel rotates a direction opposite to the sense of the rotation of said semiclutches; a mechanism for reversing said clutch; a switch-over link in said mechanism; a resilient arrangement in said mechanism pressing said semiclutches after they have been brought into interaction by means of said mechanism for reversing the clutch.

2. A device as claimed in claim 1, wherein said switch-over link is hinged to said mechanism for reversing the clutch, and said resilient arrangement consists of two leaf springs pressing said switch-over link from two opposite sides.

* * * * *